(12) United States Patent
Hu et al.

(10) Patent No.: US 11,009,969 B1
(45) Date of Patent: May 18, 2021

(54) INTERACTIVE DATA INPUT

(71) Applicant: INTERNATIONAL BUSINESS MACHINES CORPORATION, Armonk, NY (US)

(72) Inventors: Ye Chang Hu, Shanghai (CN); Ying Shao, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/702,024

(22) Filed: Dec. 3, 2019

(51) Int. Cl.
  *G06F 3/023* (2006.01)
  *G06N 20/00* (2019.01)
  *G06F 3/01* (2006.01)

(52) U.S. Cl.
  CPC ............ *G06F 3/0236* (2013.01); *G06F 3/017* (2013.01); *G06F 3/0237* (2013.01); *G06N 20/00* (2019.01)

(58) Field of Classification Search
  CPC ........ G06F 3/0236–0237; G06F 3/017; G06N 20/00
  See application file for complete search history.

(56) References Cited

U.S. PATENT DOCUMENTS

| 7,186,041 | B2 | 3/2007 | Harley |
| 8,762,129 | B2 | 6/2014 | Huang et al. |
| 9,104,247 | B2 | 8/2015 | Maw |
| 9,471,220 | B2 | 10/2016 | Zhai et al. |
| 9,547,438 | B2 | 1/2017 | Bromer |
| 2007/0046641 | A1* | 3/2007 | Lim ................ G06F 3/0237 345/173 |
| 2012/0249417 | A1* | 10/2012 | Cho ................ G06F 3/0304 345/156 |
| 2013/0151234 | A1* | 6/2013 | Huang .............. G06F 40/126 704/8 |
| 2013/0174091 | A1 | 7/2013 | Park et al. |
| 2015/0121287 | A1 | 4/2015 | Fermon |
| 2015/0248235 | A1 | 9/2015 | Offenberg et al. |
| 2016/0077734 | A1 | 3/2016 | Buxton et al. |

(Continued)

FOREIGN PATENT DOCUMENTS

CN 107145233 A 9/2017

OTHER PUBLICATIONS

Yousaf, M.H. et al., "Visual Gesture Based Augmented Virtual Keyboard System," Nucleus 50, No. 4, (2013): 381-386.

(Continued)

*Primary Examiner* — Roland J Casillas
(74) *Attorney, Agent, or Firm* — Cuenot, Forsythe & Kim, LLC

(57) ABSTRACT

Interactive data input can include determining a plurality of character subgroups that each comprise at least one follow-on character that, based on a predetermined rule, can follow a preceding character from a predetermined set of characters that form character strings corresponding to a word within a predefined vocabulary. Two or more of the plurality of character subgroups, each of which correspond to a character selected by a user from among the predetermined set of characters, can be presented concurrently to the user in response to an electronically sensed user movement. A character string can be generated based on the user-selected character and at least one follow-on character associated with the user-selected character.

20 Claims, 9 Drawing Sheets

(56) References Cited

U.S. PATENT DOCUMENTS

2019/0004694 A1   1/2019  Lu et al.
2020/0142999 A1*  5/2020  Pedersen .............. G06F 16/35

OTHER PUBLICATIONS

Humphress, M., "NEC Announces AR Based Keyboard Called ARm Keypad," [online] Copyright ©2015 Android Headlines, Nov. 9, 2015, retrieved from the Internet: <https://www.androidheadlines.com/2015/11/nec-announces-ar-based-keyboard-called-arm-keypad.html>, 1 pg.
Lee, L.H. et al., "Hibey: Hide the keyboard in augmented reality," In 2019 IEEE Int'l. Conf. on Pervasive Computing and Communications (PerCom), pp. 1-10. IEEE, 2019.
Dudley, J.J. et al., "Fast and Precise Touch-Based Text Entry for Head-Mounted Augmented Reality with Variable Occlusion." ACM Trans. on Computer-Human Interaction (TOCHI), vol. 25, No. 6 (2018): 30.
Mell, P. et al., The Nist Definition of Cloud Computing, National Institute of Standards and Technology, U.S. Dept. of Commerce, Special Publication 800-145, Sep. 2011, 7 pg.

* cited by examiner

INTERACTIVE DATA INPUT

BACKGROUND

This disclosure relates to human-computer system interaction, and more particularly, to interactive data input to computer systems for creating virtual reality and augmented reality environments and to other computer systems.

Myriad devices enable a human to input data to a computer system, and the computer system to output data in response to the input data. This two-way communication, often referred to as human-computer interaction, can occur over different modalities. As the array of different types of computer systems has expanded, so, too, has the array of different modalities. The expansion is seen, for example, in the context of computer systems for creating virtual reality and augmented reality environments, whereby data entry can involve electronically tracking physical movements of a system user.

Virtual reality is the computer-generated simulation of a three-dimensional image or environment that a computer user can interact with in a seemingly real or physical way by using specialized electronic equipment, such as a helmet with a screen inside or gloves fitted with sensors. Augmented reality creates an enhanced version of reality using computer-based technology to overlay digital information on real-world images of something viewed through a device such as a smartphone camera or similar type device. Although often considered primarily in the context of entertainment, virtual reality and augmented reality find wide application in various other fields as well, including commerce, engineering, education, and medicine. Many observers predict continued increases in the number of users and the range of applications of virtual and augmented realities.

SUMMARY

In one or more embodiments, a method can include determining, with computer hardware, a plurality of character subgroups that each comprise at least one follow-on character which, based on a predetermined rule, can follow a preceding character from a predetermined set of characters that form character strings corresponding to a word within a predefined vocabulary. The method also can include presenting concurrently, with the computer hardware, two or more of the plurality of character subgroups, each character subgroup presented corresponding to a user-selected character that is selected from among the predetermined set of characters in response to an electronically sensed user movement. Additionally, the method can include generating, with the computer hardware, a character string based on the user-selected character and at least one follow-on character associated with the user-selected character.

In one or more embodiments, a system includes a processor configured to initiate executable operations. The executable operations can include determining a plurality of character subgroups that each comprise at least one follow-on character that, based on a predetermined rule, can follow a preceding character from a predetermined set of characters that form character strings corresponding to a word within a predefined vocabulary. The executable operations also can include presenting concurrently two or more of the plurality of character subgroups, each character subgroup presented corresponding to a user-selected character that is selected from among the predetermined set of characters in response to an electronically sensed user movement. Additionally, the executable operations can include generating a character string based on the user-selected character and at least one follow-on character associated with the user-selected character.

In one or more embodiments, a computer program product includes a computer readable storage medium having program code stored thereon. The program code is executable by a processor to initiate executable operations. The executable operations can include determining a plurality of character subgroups that each comprise at least one follow-on character that, based on a predetermined rule, can follow a preceding character from a predetermined set of characters that form character strings corresponding to a word within a predefined vocabulary. The executable operations also can include presenting concurrently two or more of the plurality of character subgroups, each character subgroup presented corresponding to a user-selected character that is selected from among the predetermined set of characters in response to an electronically sensed user movement. Additionally, the executable operations can include generating a character string based on the user-selected character and at least one follow-on character associated with the user-selected character.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
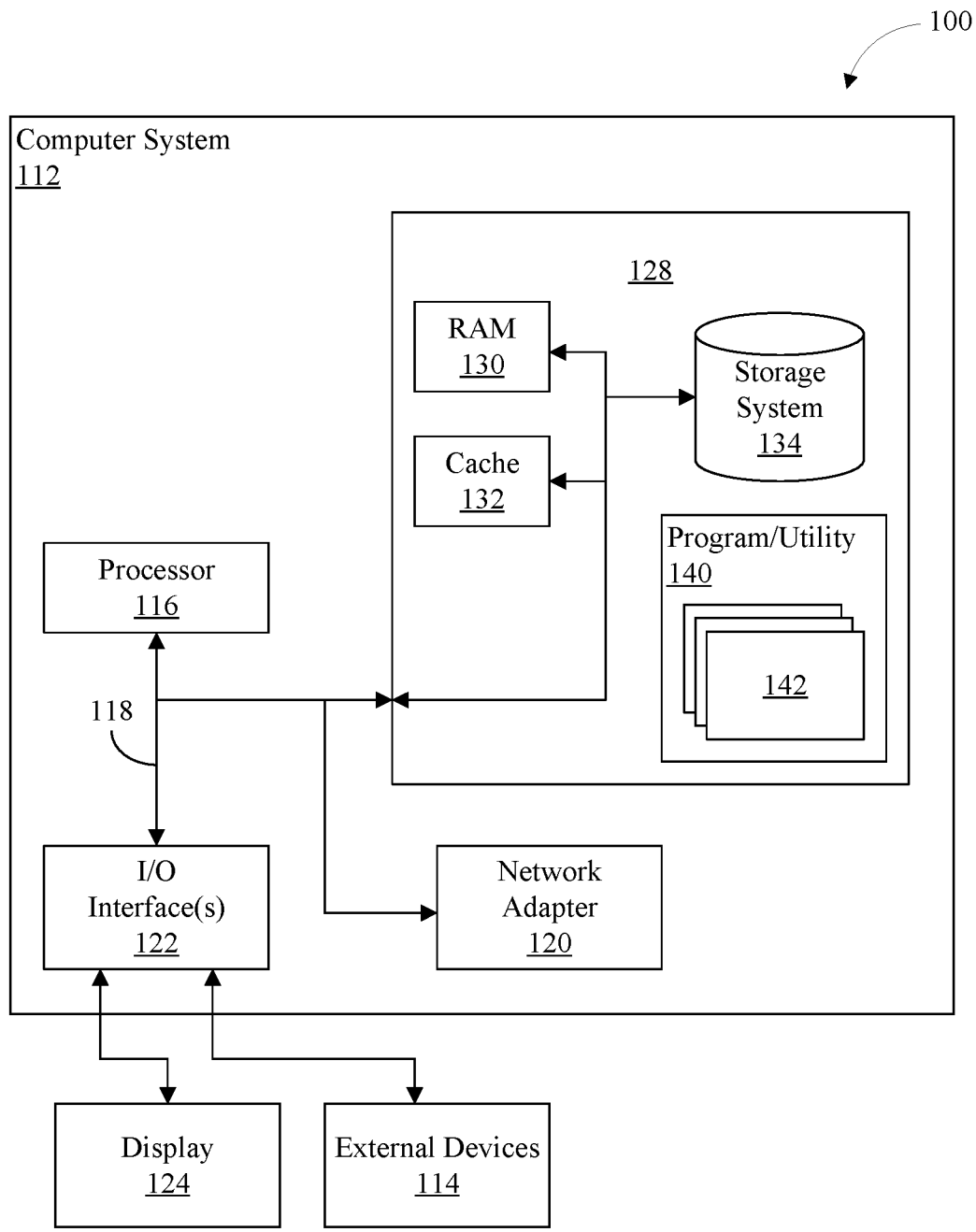
FIG. 1 depicts an example computing node for implementing some embodiments of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The disclosure relates to human-computer system interaction, and more particularly, to interactive data input to computer systems including computer systems for creating virtual reality and augmented reality environments. Data input is typically an integral component of many computer applications and systems that involve interactive computing. Interactive computing typically involves computer software programs that respond to commands and other data input by a human user. Virtual reality and augmented reality systems, for example, usually involve such interactive data input by users.

The processes, systems, and computer program products described herein in various embodiments relate to data input involving character data. The character data can comprise letters of an alphabet, such as the 26-character English language alphabet. The character data can comprise logograms, such as the Hanyu Pinyin phonetic symbols for transcribing Mandarin Chinese and adapted for writing other Asian languages. The character data can comprise character concatenations or character strings corresponding to distinct words of a generalized vocabulary of a particular language or specific topic, such as a scientific, scholarly, or technical nomenclature. The ease and efficiency with which a user is able to enter character data can be a significant determinant of the performance, both objectively measured and user-perceived, of an interactive computer system. Interactive data entry can be especially pertinent with respect to a computer system for rendering a virtual reality or augmented reality environment.

One aspect of the processes, systems, and computer program products described herein is organizing and presenting to a user a predetermined set of characters and responding to the user's selection of one of the characters (e.g., as part of a larger character string forming a word) with a specific set of candidates or follow-on characters. A candidate can comprise a single follow-on character or follow-on character string. The specific set of candidates are determined based on a predetermined rule derived from the relevant vocabulary.

If the predetermined set of characters comprises x characters, and the relevant rule dictates that no more than half of the characters can follow, then the number of follow-on characters presented after a user selects one of the characters is only x/2. The reduced number of candidates can facilitate data entry in several respects. For example, in the context of a virtual reality or augmented reality system in which characters are visually presented for the user to select from, the system-rendered visual space for presenting characters for selection is limited and the number of potential candidates may be relatively large. Presenting a reduced set of candidates based on a rule-dictated determination of possible candidates or follow-on characters enables the candidates to be presented more starkly. The reduced set of candidates also enables the user to more readily identify the desired follow-on character for inputting to the virtual reality or augmented reality system.

Another aspect the processes, systems, and computer program products described herein is the use of machine learning to ascertain a rule for determining which character or characters of a predetermined set of characters are eligible for following a preceding character selected by a user. Such a rule can be a formal rule dictated by the rules of a particular language (e.g., Chinese transcribed by Hanyu Pinyin characters), or instead, a rule that can only be determined empirically. With respect to the later, the processes, systems, and computer program products described herein can use machine learning to determine rules for dictating which character (or characters) of a predetermined set of characters can follow a preceding character selected by a user. Some embodiments of the processes, systems, and computer program products described herein incorporate unsupervised machine learning to identify rules that associate characters with follow-on characters. The rules can be identified for specific sets of characters and/or character strings (words). Machine learning-identified rules can associate characters and character strings with follow-on characters and/or character strings (words) that are likely to follow other characters or character strings. Machine learning can be applied to characters and/or character strings culled from a specialized vocabulary or nomenclature, such as the nomenclature of a specific topic, science, or technology.

Still another aspect the processes, systems, and computer program products disclosed herein is character selection in response to electronically sensed user movement. The processes, systems, and computer program products in some embodiments—ones especially applicable for use in virtual reality and augmented reality systems—enable a user to select characters using only hand or eye movements. For example, in one embodiment, the selection of characters is in response to a user's hand or finger movement relative to a visually presented set of virtual characters. In another embodiment, for example, the selection is made in response to a user's eye movement or gaze in relation to visually displayed virtual characters.

Further aspects of the embodiments described within this disclosure are described in greater detail with reference to the Figures below. For purposes of simplicity and clarity of illustration, elements shown in the Figures have not necessarily been drawn to scale. For example, the dimensions of some of the elements may be exaggerated relative to other elements for clarity. Further, where considered appropriate, reference numbers are repeated among the Figures to indicate corresponding, analogous, or like features.

FIG. 1 depicts example computing node 100, which can implement certain embodiments of an interactive data entry system. Computing node 100, in one or more embodiments, is an example of a cloud computing node. Although computing node 100 is capable of performing certain interactive data entry functionalities described within this disclosure, it is not intended to suggest any limitation as to the scope of use or functionality of embodiments of an interactive data entry system.

Illustratively, computing node 100 includes computer system 112, which is operational with numerous other general-purpose or special-purpose computing system environments or configurations. Examples of well-known computing systems, environments, and/or configurations that may be suitable for use with computer system 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments (e.g., cloud computing environment) that include any of the above systems or devices, and the like.

Computer system 112 may be described in the general context of computer system-executable instructions, such as program modules, being executed by a computer system. Generally, program modules may include routines, programs, objects, components, logic, data structures, and so on that perform particular tasks or implement particular abstract data types. Computer system 112 may be practiced in distributed computing environments (e.g., cloud computing environment) where tasks are performed by remote processing devices that are linked through a communications network. In a distributed computing environment, program modules may be located in both local and remote computer system storage media including memory storage devices.

As shown in FIG. 1, computer system 112 is shown in the form of a general-purpose computing device. The components of computer system 112 may include, but are not limited to, one or more processors 116, a memory 128, and a bus 118 that couples various system components including memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 112 typically includes a variety of computer system readable media. Such media may be any available media that is accessible by computer system 112, and may include both volatile and non-volatile media, removable and non-removable media.

Memory 128 may include computer system readable media in the form of volatile memory, such as random-access memory (RAM) 130 and/or cache memory 132. Computer system 112 may further include other removable/non-removable, volatile/non-volatile computer system storage media. By way of example, storage system 134 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein. For example, one or more of the program modules may carry out the functions and/or methodologies of an interactive data entry system such as that described below with reference to FIG. 2.

Program/utility 140 is executable by processor 116. Program/utility 140 and any data items used, generated, and/or operated upon by computer system 112 are functional data structures that impart functionality when employed by computer system 112. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 112 may also communicate with one or more external devices 114 such as a keyboard, a pointing device, a display 124, etc.; one or more devices that enable a user to interact with computer system 112; and/or any devices (e.g., network card, modem, etc.) that enable computer system 112 to communicate with one or more other computing devices. Such communication can occur via input/output (I/O) interfaces 122. Computer system 112 can communicate with one or more networks such as a local area network (LAN), a general wide area network (WAN), and/or a public network (e.g., the Internet) via network adapter 120. As depicted, network adapter 120 communicates with the other components of computer system 112 via bus 118. It should be understood that although not shown, other hardware and/or software components could be used in conjunction with computer system 112. Examples include, but are not limited to, microcode, device drivers, redundant processing units, external disk drive arrays, RAID systems, tape drives, and data archival storage systems, etc.

While computing node 100 is used to illustrate an example of a computing node, it should be appreciated that a computer system using an architecture the same as or similar to that described in connection with FIG. 1 may be used to perform the various operations described herein. In this regard, the example embodiments described herein are not intended to be limited to a specific computing environment. Computing node 100 is an example of a data processing system. As defined herein, the term "data processing system" means one or more hardware systems configured to process data, each hardware system including at least one processor programmed to initiate executable operations and memory.

Computing node 100 is an example of computer hardware. Computing node 100 may include fewer components than shown or additional components not illustrated in FIG. 1 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 100 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 2:
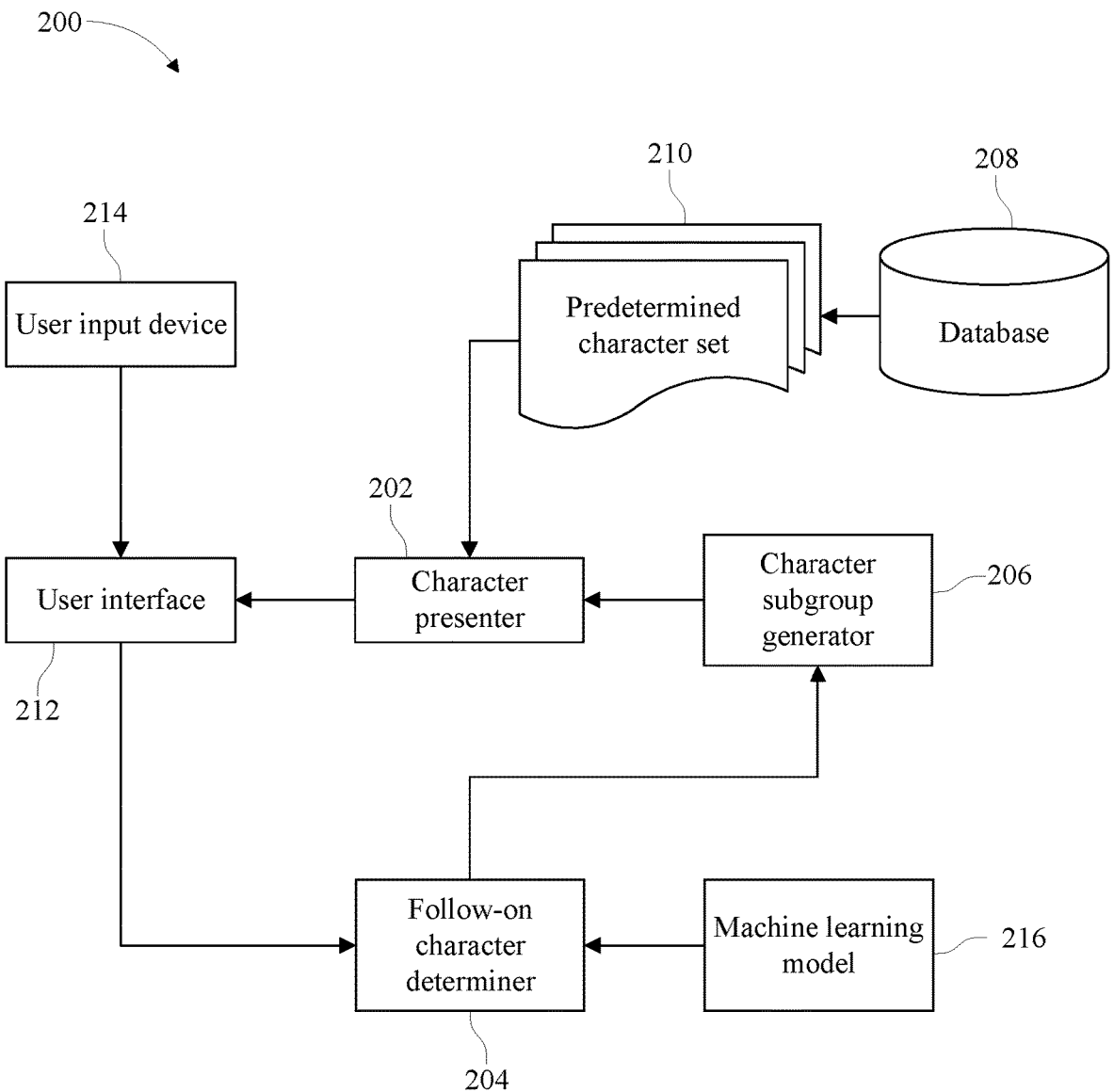
FIG. 2 depicts an interactive data entry system according to an embodiment of the present invention.

FIG. 2 depicts interactive data entry system 200, which illustrates one embodiment of an interactive data entry system. System 200 illustratively includes character presenter 202, follow-on character determiner 204, and character subgroup generator 206 operatively coupled together. Optionally, system 200 can include database 208, which electronically stores predetermined character set 210 and, illustratively, is communicatively coupled with character presenter 202. Predetermined character set 210 comprises a set of characters represented in a computer-system readable format. The characters can comprise letters of an alphabet (e.g., a Roman or Latin alphabet such as the 26 letters of the modern English alphabet), Hanyu Pinyin phonetic symbols for transcribing Chinese, logograms (e.g., Chinese hanzi, Japanese kanji and Korean hanja), character strings corresponding to distinct words of a general vocabulary or topic-specific nomenclature (e.g., set of technical terms or other subject matter-specific words), and/or symbols that individually and/or jointly form words of predefined vocabulary.

Operatively, character presenter 202 presents to a user multiple characters (illustratively, predetermined character set 210). Character presenter 202, in certain embodiments, can organize the characters into multiple character groups for visual presentment of the complete set of characters as a single display of characters arranged in distinct groups. For example, based on the rule regarding the characters (Romanized letters) associated with the Chinese phonetic alphabet, character presenter 202 can present six three-member groups and one five-member group of characters. Follow-on character determiner 204 determines for each character a corresponding one or more follow-on characters culled from the larger predetermined character set 210. With respect to any predetermined character set, such as predetermined character set 210, follow-on character determiner 204 determines, based on a predetermined rule, which specific characters can follow a preceding character. As defined herein, "rule" is defined as an association or correspondence between two or more characters such that a selection of one character dictates a corresponding one or more other characters that can follow the selected character to form a character string representing a word of a predefined vocabulary. For example, as illustrated below, a rule of the Pinyin phonetic alphabet is that no more than six characters of the alphabet are allowable follow-on characters for any other character culled from the alphabet. Based on the determination of allowable follow-on characters by follow-on character determiner 204, the characters of predetermined character set 210 are grouped by character subgroup generator 206 into character subgroups.

In response to a user's selection of a character presented to the user, character presenter 202 presents one or more corresponding character subgroups generated by subgroup generator 206, each of the subgroup corresponding to the user-selected character and comprising only one or more follow-on characters associated with the user-selected character. The user can generate a character string comprising a word of a predefined vocabulary. To do so, the user can iteratively select from among a succession of characters presented, each selection generating a subgroup that, based on a preceding selection, yields a reduced set of candidates as follow-on characters. The user can generate the character string corresponding to the word by iteratively selecting characters from among the succession of characters presented until a character string representing the word is generated by the user. System 200 can input the word to a computing system (e.g., virtual reality system, augmented reality system, or other system) that system 200 is integrated in or is operatively coupled with. In some embodiments, system 200 and the system that receives the input can be located remotely from one another and communicatively coupled via a communications network (e.g., local area network, wide area network, or the Internet). System 200 and the system that receives the input optionally can communicate via a wired or wireless connection.

In one embodiment, system 200 is implemented in computer system-executable instructions (e.g., one or more program modules) that are executable by a processor such as processor 116 of computer system 112 described with reference to FIG. 1. Accordingly, system 200 can be implemented, for example, in computer-system instructions executable on a server (e.g., cloud-based server) or other type of computer system. In other embodiments, one or more of character group generator 202, follow-on character determiner 204, and character subgroup generator 206 can be implemented in hardwired circuitry or in a combination of hardwired circuitry and computer system-executable instructions.

System 200, in certain embodiments, can be integrated in or operatively coupled with a virtual reality system or an augmented reality system. The virtual reality system or augmented reality system can be implemented as a stand-alone device, in an application-specific computing system, or as an application program that executes on a general-purpose computing system operatively coupled to peripheral devices for rendering a virtual reality or augmented reality environment. As defined herein, a "virtual reality environment" is a computer-generated environment that simulates a system user's physical presence in a simulated environment and the system user's interaction with computer-generated objects or elements rendered therein. An "augmented reality environment," as defined herein, is an environment generated by a device that is carried with a user (either on user's person or on a mobile device/apparatus that travels with the user) and includes one or more processors and memory, the device being capable of augmenting real world elements presented to the user by the device.

A virtual reality system, for example, can include a desktop display or headset for rendering a 3D virtual environment. The headset can provide a head-mounted display that includes a binaural audio system, separate high-resolution OLED or LCD monitors for providing stereographic renderings of a 3D virtual environment, and sensors for tracking of head movements. Optional motion controls with haptic feedback using a movement tracker such as a haptic glove having sensors for capturing data corresponding to physical movements (e.g., finger movements or hand motions) and simulating a user's interaction with the virtual world. Examples of augmented reality devices include glasses (e.g., smart glasses), headsets, and mobile devices (e.g., smart phone) for executing virtual or augmented reality applications.

With system 200 integrated in or operatively coupled with a virtual reality or augmented reality system, a user can interact with the system-generated virtual or augmented reality environment using a variety of interaction devices. For example, a user can interact with a virtual reality system using virtual reality goggles that have a screen display for each lens and are equipped with motion sensors that cause the view of the virtual or augmented real world presented to the user to move based on the user's head movements. The user also can wear a pair of haptic gloves configured to translate motion and movement of the user's hands into avatar movements within the virtual reality environment. Of course, virtual reality systems and augmented reality systems are not limited to these examples and one of ordinary skill in the art will readily recognize that system 200 can be integrated in or operatively coupled with various other distinct types of virtual reality and augmented reality systems for providing interactive data input.

Referring additionally to FIGS. 3A-3D, certain operative features of system 200 are depicted. The operative features are illustrated with system 200 working in conjunction with an example virtual reality or augmented reality (VR/AR) system, which in one embodiment uses a Chinese phonetic alphabet (e.g., Hanyu Pinyin to transcribe Mandarin Chinese sounds into the Roman alphabet) for inputting Chinese text by a system user. Character group generator 202 uses the language rules dictating that no more than six specific characters can follow a corresponding previous character using the Chinese phonetic alphabet to input Chinese text to generate multiple character groups.

Figure 3A:
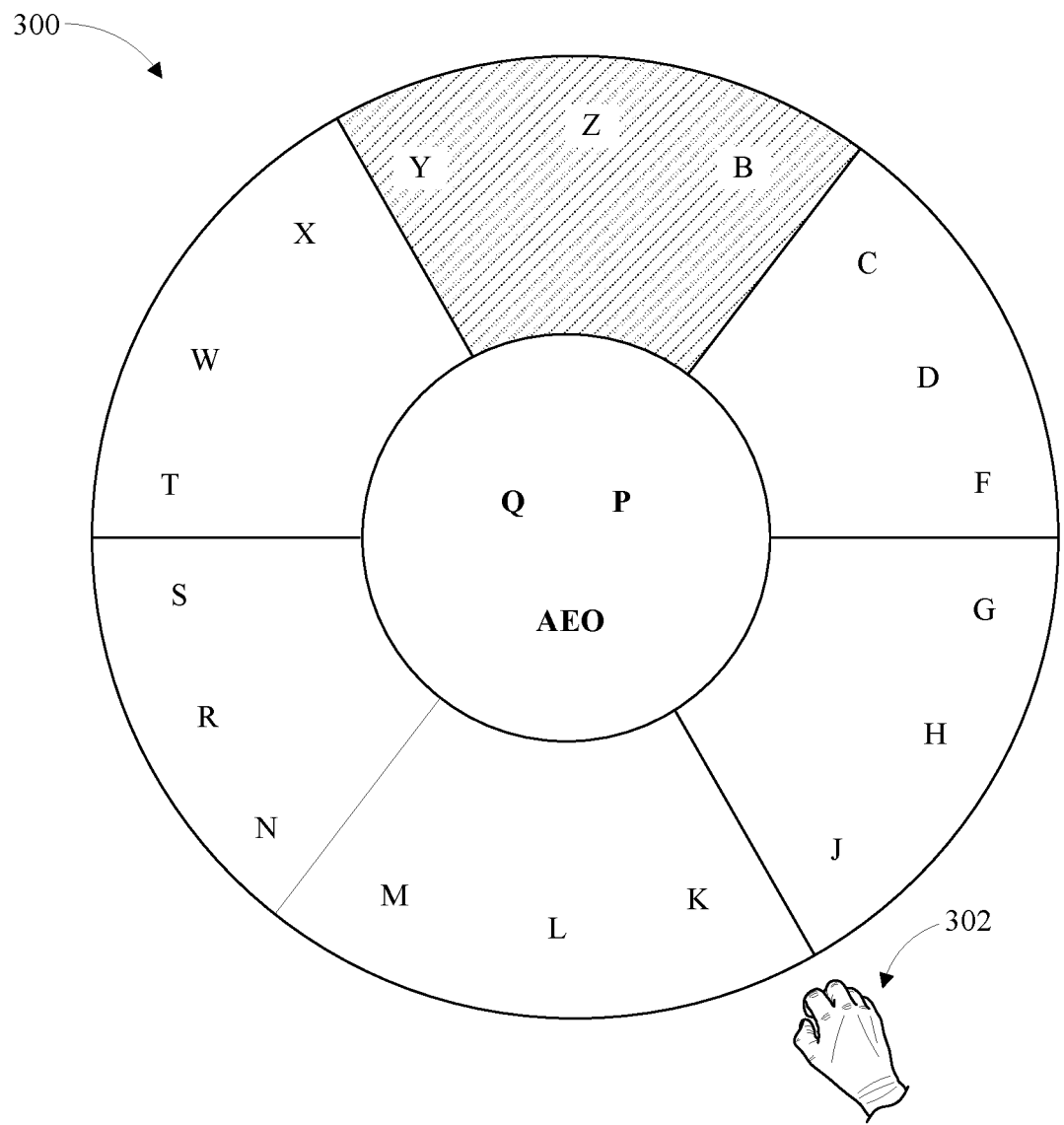
FIGS. 3A-3D depict certain operative features of an interactive data entry system according to an embodiment of the present invention.
Figure 3B:
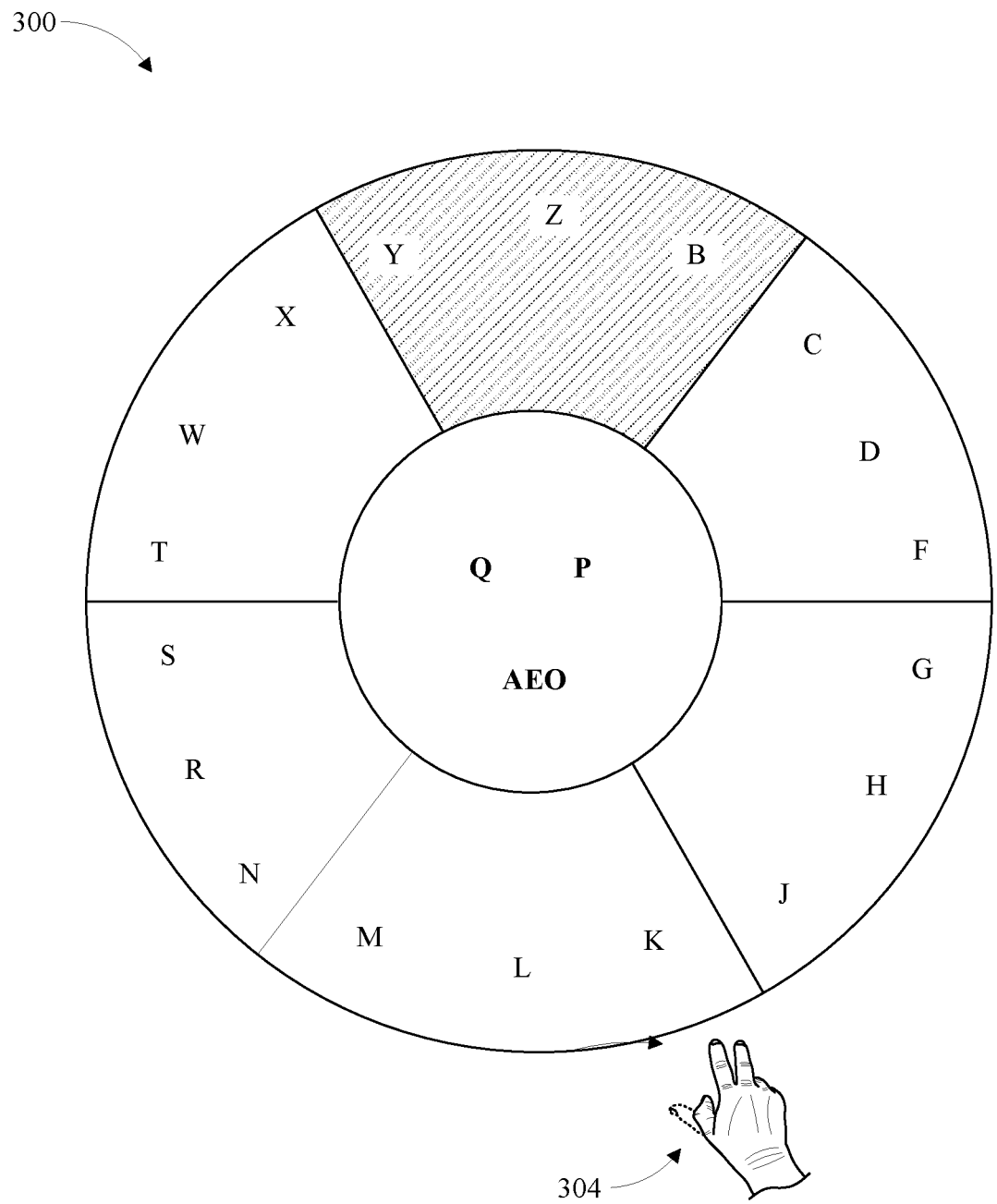

In FIG. 3A, a virtual rearrangement of the keys of a QWERTY keyboard comprising the 26 letters of the modern English alphabet is visually displayed as image 300. Character presenter 202 illustratively organizes the 26 letters into six three-character groups and one five-character group. So arranged, image 300 is presented by character presenter 202 with the three-character groups arrayed circularly around the centrally positioned five-character group forming distinct regions on a wheel, each region corresponding to a character group (or subgroup as the case may be). In one embodiment, system 200 optionally includes user interface 212 and image 300 can be displayed on user interface 212. In one embodiment user interface 212 can be a head-mounted display, as described above. In another embodiment, user interface can be a desktop display, as also described above.

Optionally, system 200 also includes user input device 214. A user selects a character with user input device 214. In one embodiment, user input device 214 is a haptic glove, as described above, for capturing data corresponding to user finger movements or hand motions. User input device 214, in other embodiments, can be a camera that captures visual images of the user's finger movements and/or hand motions. Using the haptic glove or camera, the user mimics typing "Yong" corresponding to Chinese character "用" using hand and finger movements. Using hand motions and finger movements, the user navigates among the visually presented distinct regions of the wheel containing different character groups.

In FIG. 3A, using a motion of wrist and forearm together, the user navigates to the three-character group positioned in the top region of the visually presented wheel. The user selects that region of the wheel—the region comprising character group "Y," "Z," and "B"—with user movement 302, which is a twist of the wrist with all fingers retracted to make a fist. The user can select one of the three characters of the group, "Y," "Z," or "B," respectively, using the thumb, index finger, or middle finger. For example, system 200 can associate each distinct character (letter) with a specific finger or the thumb of the user. Illustratively, in FIG. 3B, the user selects "Y" with user movement 304 of the user's thumb.

It should be appreciated that any of a variety of different gestures may be used and that the examples provided are for purposes of illustration and not limitation. In the examples described, a first gesture may be used to select a region and a second, different gesture used to select a particular item within the region when the region includes more than one item. In cases where the region includes only one item, the gesture used to select the region may also select the item within the selected region.

Figure 3C:
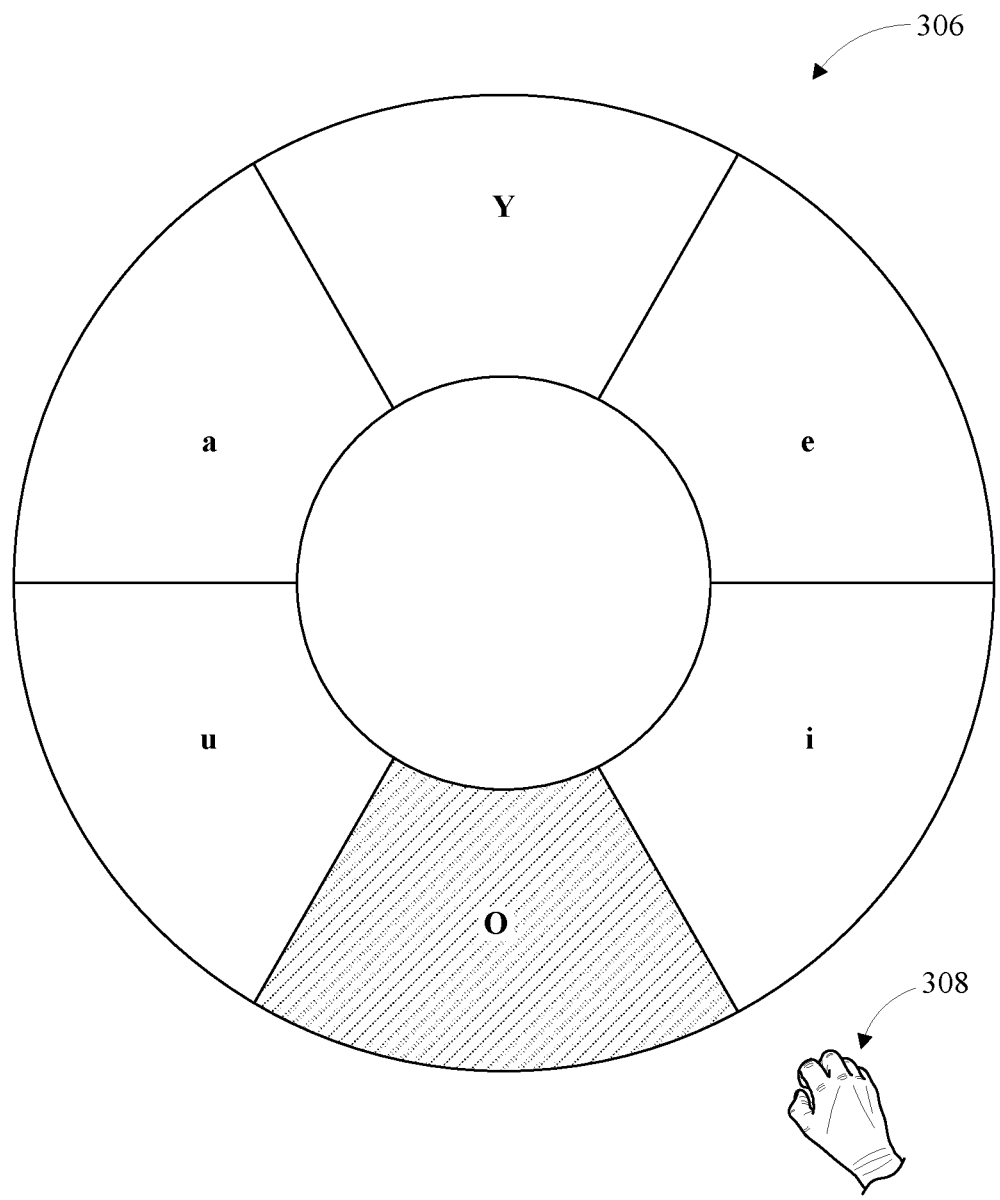

In FIG. 3C, system 200 responds to the user's selection of a character—illustratively, character "Y"—by character presenter 202 presenting of a new visual image in which the characters of each of the distinct regions of the wheel are replaced by subgroups of one or more follow-on characters. Illustratively, the new visual image comprises multiple subgroups 306, each generated by character subgroup generator 206 and each presented by character presenter 202 in one of the distinct regions of the wheel. The subgroups corresponding to character "Y" each comprise a single follow-on character determined by follow-on character determiner 204. The follow-on characters corresponding to character "Y" are the characters "e," "i," "o," "u," and "a," as determined based on the above-described rule implemented by follow-on character determiner 204.

Figure 3D:
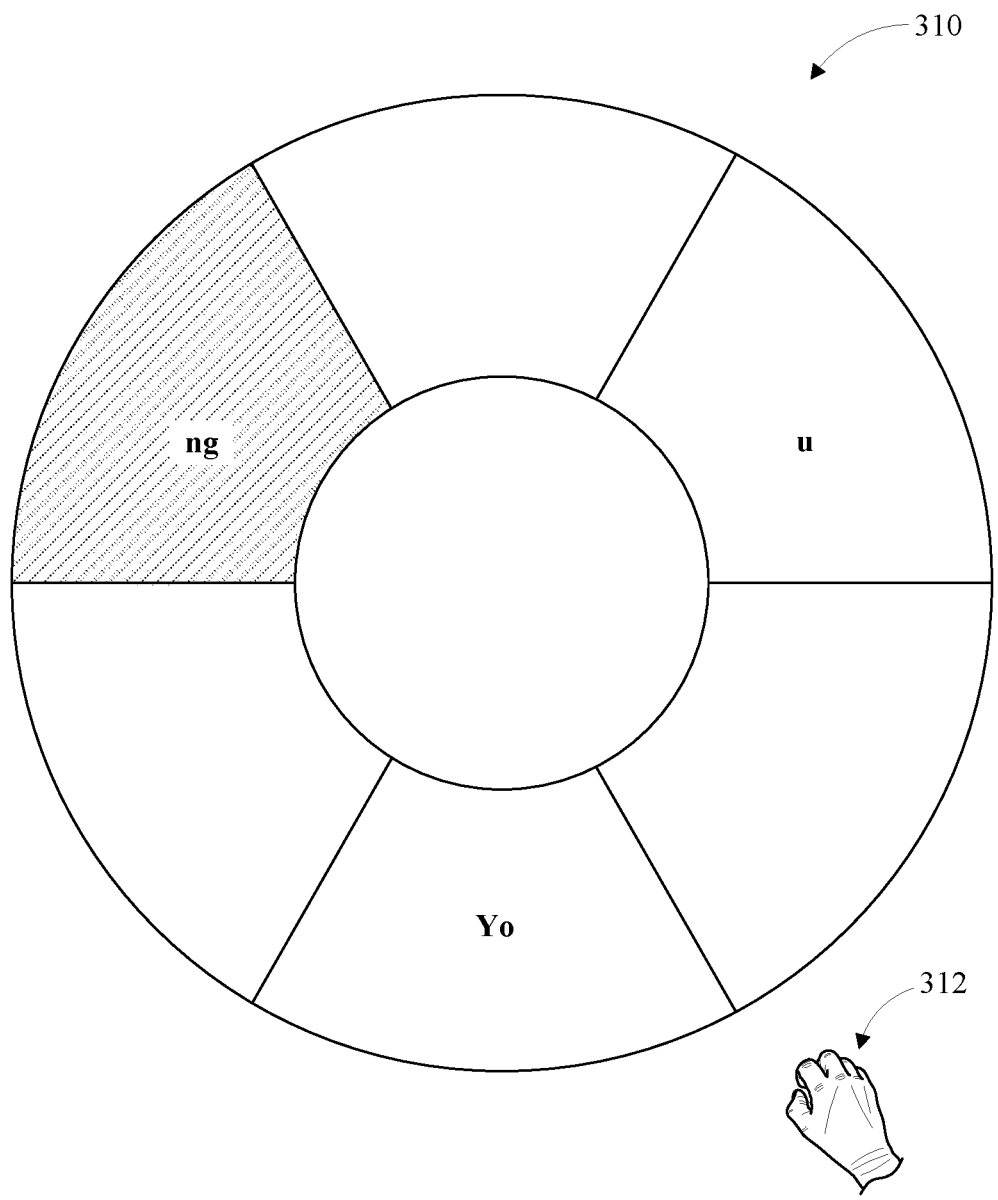

The user selects "o" using hand movement 308, and as shown in FIG. 3D, follow-on character determiner 204 determines another plurality of subgroups 310. The subgroups 310, based on the rule implemented by follow-on character determiner 204, are a subgroup comprising character string "ng" and another comprising character "u." The user can select character string "ng" with hand movement 312 to generate the character string "Yong" (English language transcription of "用"), which can be input to a virtual reality or augmented reality system that system 200 is integrated in or is operatively coupled with as described above.

In the example of FIGS. 3A-3D, the regions shown in image 300 may remain static and/or unchanging while the system adaptively updates the particular items shown in the respective regions. Further, as illustrated in FIG. 3D, in some cases, depending on the rule(s) specifying the follow-on characters, some regions may not include any items (e.g., be empty). In some embodiments, for regions of image 300 that include at least one character, each character displayed may appear in only one region (e.g., is not repeated or duplicated across more than one region).

As illustrated, character presenter 202 can reorganize characters into distinct groups that are visually presented in a manner that enables the user to more easily identify individual characters. For example, in the context of transcribing Chinese, the 26 characters typically displayed on a QWERTY keyboard arranged into 7 groups and visually presented by character presenter 202 as three-character groups arrayed circularly around a centrally positioned five-character group. In various embodiments, the characters can be organized for visual display according to the likelihood of a user's selection of each specific character. In one embodiment, the likelihood can be probabilistically conditioned on a particular vocabulary, such as the transcribing of Chinese using Pinyin characters.

With each character selection by a user, system 200 generates one or more subgroups that comprise a reduced set of characters thereby enabling a user to more readily identify follow-on characters for interactively generating data input in the form of character strings. For example, as described with respect to phoneticized Chinese, the system relies on a rule dictating that no more than six follow-on characters are allowable after the user selects a preceding character. The successive presentation of reduced-size subgroups of characters can ease the user's burden of interactively inputting data and reduce the possibilities of mistakenly selecting the wrong character. In various embodiments, user input device 214 can be configured to recognize different gestures to complete the operations described.

In another embodiment, user input device 214 can be configured to determine a user's selection of characters presented by character presenter 202 based on a user's eye movements or a user's gaze. User input device 214 can utilize an optical tracker that can be incorporated in a headset or glasses worn by the user. The optical tracker, for example, can comprise one or more cameras that use infrared light to generate a grayscale image of the user's pupil. From the position of the pupil in the image, processor-executable instructions running on a computer system can determine where the user's gaze is directed on a visual image presented by character presenter 202. The optical tracker also can sense the infrared light reflected from the user's eye to determine the user's eye rotations and/or gaze based on changes in the reflections.

In still another embodiment, system 200 optionally can include machine learning model 216. Machine learning is used to construct a model to ascertain a rule for determining which character or characters of a predetermined set of characters are eligible for following another character previously selected by a user. Using machine learning the model can identify a rule that certain characters of a predefined set of characters or character strings comprising words of a predefined vocabulary are more likely to follow one character or character string than another. Machine learning model 216, in one embodiment, can be constructed using unsupervised machine learning. Unsupervised machine learning algorithms can discover a rule in instances where, given a particular alphabet or vocabulary, no rule has previously been enunciated. An association machine learning algorithm can discover an association rule that associates one character or character string with another. For example, the learned association can be that character "Y" is more likely to be followed by "a," "e," "i," "o," or "u" than any other character of a particular set of characters, or that character string "Yo" is more likely to be followed by "ng" or "u" than any other.

Moreover, an association machine learning algorithm can discover a rule or rules with respect to the vocabulary or nomenclature of a particular topic or specific subject matter. For example, with respect to subject matter pertaining to electrical engineering, the association rule discovered using unsupervised machine learning may associate the subject matter character string "CMOS" with the character string "transistor," indicating a high probability that if a user selects the former character string the latter is very likely a follow-on character string. Similarly, for example, with respect to economics, the association discovered with unsupervised machine learning can indicate a high probability that the subject matter that character string "product" is highly likely to be followed by subject matter character strings "complementary" or "substitute."

Figure 4:
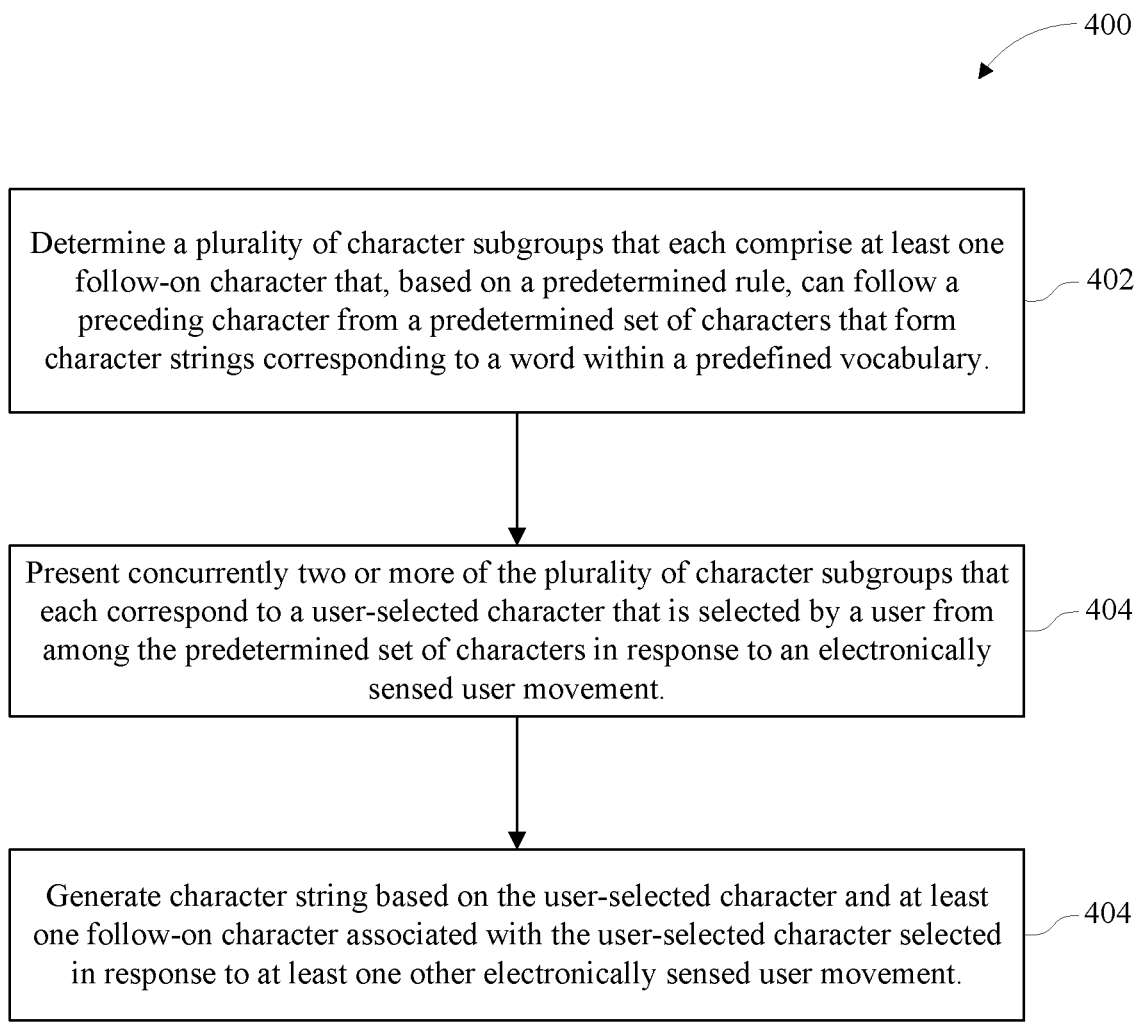
FIG. 4 is a flowchart of a method of interactive data entry according to an embodiment of the present invention.

FIG. 4 is a flowchart of method 400 for interactive data entry, according to one embodiment. Method 400 can be performed by a system the same as or similar to the systems described in reference to FIGS. 1, 2, and 3A-3D. At block 402, the system determines a plurality of character subgroups. Each subgroup comprises one or more characters that, based on a predetermined rule, can follow a preceding character from a predetermined set of characters that form character strings corresponding to a word within a predefined vocabulary.

The predetermined set of characters can comprise characters represented in a computer-system readable format. The characters can correspond to letters of an alphabet (e.g., a Romanized alphabet such as the 26 letters of the modern English alphabet), transcription characters (e.g., Hanyu Pinyin phonetic symbols for transcribing Chinese), character strings corresponding to distinct words of a general vocabulary, character strings corresponding to words of a topic-specific nomenclature (e.g., set of technical terms or other subject matter-specific words), and/or symbols that individually and/or jointly form words of a predefined vocabulary.

At block 404, the system presents concurrently two or more of the plurality of character subgroups. Each of the character subgroups presented corresponds to a user-selected character that is selected by a user from among the predetermined set of characters. The user-selected character is determined in response to an electronically sensed user movement.

An electrically sensed user movement can comprise hand and/or finger movements, for example, which are sensed by a haptic glove worn by the user. Alternatively, or additionally, the electrically sensed user movement can comprise eye movements or gaze of the user which are captured by an optical tracker incorporated, for example, in a headset or glasses worn by the user.

The system, at block 406, generates a character string based on the user-selected character and one or more follow-on characters associated with the user-selected character. The system can determine the user-selected character and the one or more follow-on characters in response to electronically sensed user movements.

The system can present one or more of the plurality of character subgroups by iteratively presenting a series of character subgroups that each correspond to a character or group of characters selected from an immediately preceding plurality of subgroups by the user. The series of characters selected are determined by the system in response to a corresponding series of electronically sensed user movements. Each succeeding one the series of character subgroups presented can comprise fewer characters or groups of characters than contained in the immediately preceding plurality of subgroups.

In one embodiment, each character and each follow-on character corresponds to a Romanized letter and the multiple character groups are constructed based on a Chinese phonetic system. The allowable follow-on characters can be determined, for example, based on the Pinyin phonetic system.

In another embodiment, follow-on characters can be determined by the system based on a machine learning model. The machine learning model can identify a rule that determines which characters of a predefined set of characters or character strings comprising words of a predefined vocabulary are more likely to follow one character or character string than another. The machine learning model, in various embodiments, can be constructed using unsupervised machine learning. Unsupervised machine learning association algorithms can discover an association rule that associates one character or character string with another. In one embodiment, the machine learning model is a model constructed using unsupervised machine learning.

Embodiments of the present invention have been described in the context of certain computing environments. The embodiments are capable of being implemented in conjunction with any other type of computing environment now known or later developed.

As noted above, one such computing environment is a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
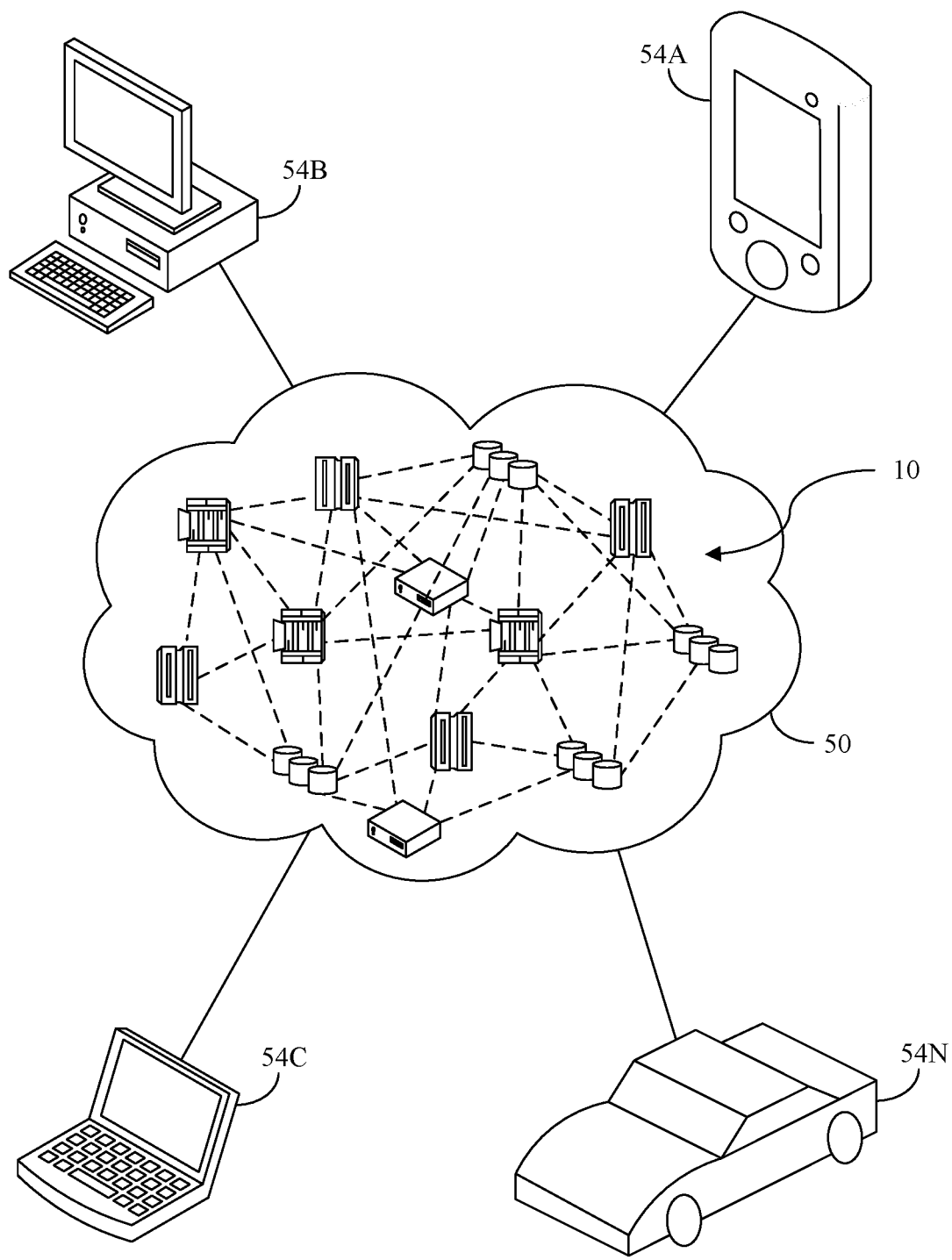
FIG. 5 depicts an illustrative cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
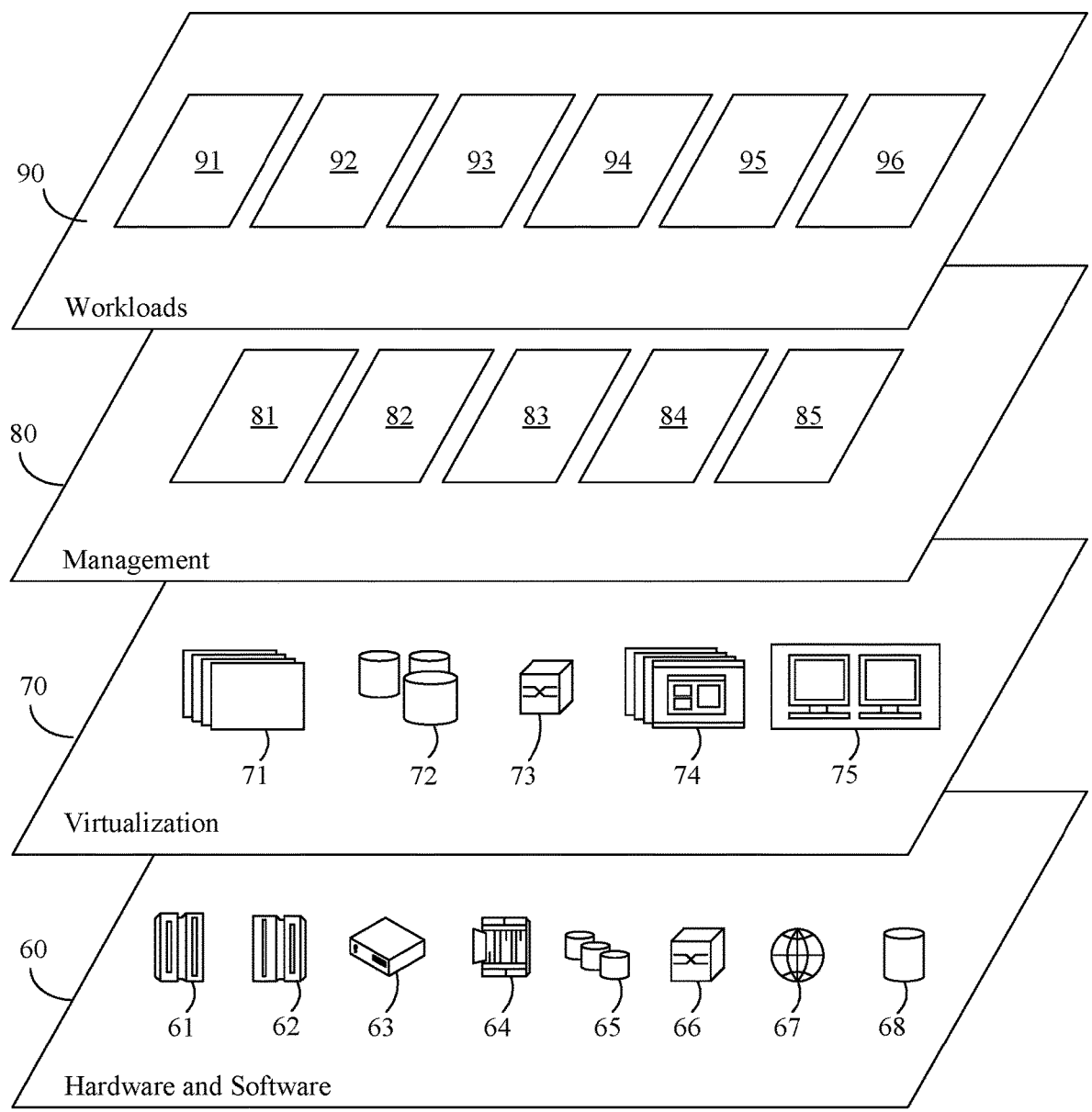
FIG. 6 depicts example abstraction model layers of the illustrative cloud computing environment of FIG. 5 according to an embodiment of the present invention.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interactive data entry 96. System 100 provides a way to build and apply interactive data entry.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   first presenting, concurrently, a plurality of separately-selectable character groups each containing a plurality of characters;

receiving, from a user using a first hand gesture, a selection of one of the plurality of separately-selectable character groups;

receiving, from the user using a finger gesture, a selection of a particular character in the selected one of the plurality of separately-selectable character groups;

second presenting, concurrently, a plurality of character subgroups that each include at least one follow-on character that, based on a predetermined rule, can follow the selected particular character;

receiving, from the user using a second hand gesture, a selection of one of the plurality of character subgroups; and generating a character string using the selection of the particular character and the selection of the one of the plurality of character subgroups.

2. The method of claim 1, wherein
the plurality of separately-selectable character groups are presented as a central character group surrounded by remaining ones of the plurality of separately-selectable character groups, and
each of the remaining ones of the plurality of separately-selectable character groups are individually selectable based upon a motion relative to the central character group.

3. The method of claim 2, wherein
the central character group is displayed as a central region, and
the remaining ones of the plurality of separately-selectable character groups are displayed as six selectable wheel portions surrounding the central region.

4. The method of claim 3, wherein
the six selectable wheel portions surrounding the central region define selectable regions for the plurality of character subgroups.

5. The method of claim 1, wherein
the hand gesture used to select one of the plurality of separately-selectable character groups includes the user retracting all fingers into a first and rotating a wrist.

6. The method of claim 5, wherein
the finger gesture used to select the particular character in the selected one of the plurality of separately-selectable character groups includes the user using a particular finger mapped to the particular character.

7. The method of claim 1, wherein
the first and second presenting are performed in a 3D virtual environment.

8. A computer hardware system, comprising:
a hardware processor configured to initiate the following executable operations:
 first presenting, concurrently, a plurality of separately-selectable character groups each containing a plurality of characters;
 receiving, from a user using a first hand gesture, a selection of one of the plurality of separately-selectable character groups;
 receiving, from the user using a finger gesture, a selection of a particular character in the selected one of the plurality of separately-selectable character groups;
 second presenting, concurrently, a plurality of character subgroups that each include at least one follow-on character that, based on a predetermined rule, can follow the selected particular character;
 receiving, from the user using a second hand gesture, a selection of one of the plurality of character subgroups; and
 generating a character string using the selection of the particular character and the selection of the one of the plurality of character subgroups.

9. The system of claim 8, wherein
the plurality of separately-selectable character groups are presented as a central character group surrounded by remaining ones of the plurality of separately-selectable character groups, and
each of the remaining ones of the plurality of separately-selectable character groups are individually selectable based upon a motion relative to the central character group.

10. The system of claim 9, wherein
the central character group is displayed as a central region, and
the remaining ones of the plurality of separately-selectable character groups are displayed as six selectable wheel portions surrounding the central region.

11. The system of claim 10, wherein
the six selectable wheel portions surrounding the central region define selectable regions for the plurality of character subgroups.

12. The system of claim 8, wherein
the hand gesture used to select one of the plurality of separately-selectable character groups includes the user retracting all fingers into a first and rotating a wrist.

13. The system of claim 12, wherein
the finger gesture used to select the particular character in the selected one of the plurality of separately-selectable character groups includes the user using a particular finger mapped to the particular character.

14. The system of claim 8, wherein
the first and second presenting are performed in a 3D virtual environment.

15. A computer program product, comprising:
a computer readable storage medium having program instructions embodied therewith,
the program instructions, which when executed by a computer hardware system, cause the computer hardware system to perform:
 first presenting, concurrently, a plurality of separately-selectable character groups each containing a plurality of characters;
 receiving, from a user using a first hand gesture, a selection of one of the plurality of separately-selectable character groups;
 receiving, from the user using a finger gesture, a selection of a particular character in the selected one of the plurality of separately-selectable character groups;
 second presenting, concurrently, a plurality of character subgroups that each include at least one follow-on character that, based on a predetermined rule, can follow the selected particular character;
 receiving, from the user using a second hand gesture, a selection of one of the plurality of character subgroups; and
 generating a character string using the selection of the particular character and the selection of the one of the plurality of character subgroups.

16. The computer program product of claim 15, wherein
the plurality of separately-selectable character groups are presented as a central character group surrounded by remaining ones of the plurality of separately-selectable character groups, and each of the remaining ones of the plurality of separately-selectable character groups are individually selectable based upon a motion relative to the central character group.

17. The computer program product of claim 16, wherein the central character group is displayed as a central region, and the remaining ones of the plurality of separately-selectable character groups are displayed as six selectable wheel portions surrounding the central region.

18. The computer program product of claim 17, wherein the six selectable wheel portions surrounding the central region define selectable regions for the plurality of character subgroups.

19. The computer program product of claim 15, wherein the hand gesture used to select one of the plurality of separately-selectable character groups includes the user retracting all fingers into a first and rotating a wrist.

20. The computer program product of claim 19, wherein the finger gesture used to select the particular character in the selected one of the plurality of separately-selectable character groups includes the user using a particular finger mapped to the particular character.

\* \* \* \* \*